United States Patent [19]

Leavitt, Sr. et al.

[11] Patent Number: 4,883,556

[45] Date of Patent: Nov. 28, 1989

[54] METHOD FOR APPLYING INFORMATION TO A TRANSPARENT SURFACE

[76] Inventors: Edward J. Leavitt, Sr., 823 Fontana, Richardson, Tex. 75080; Edward J. Leavitt, Jr., 535 E. Charleston, Phoenix, Ariz. 85022

[21] Appl. No.: 854,405

[22] Filed: Apr. 21, 1986

[51] Int. Cl.⁴ ............................................. B32B 31/28

[52] U.S. Cl. ................................ 156/273.3; 156/277; 430/320

[58] Field of Search ..................... 156/277, 240, 272.2, 156/273.3; 428/137, 138, 914; 430/322, 324, 320, 321, 330

[56] References Cited

U.S. PATENT DOCUMENTS 4,056,648 11/1977 Richardson ......................... 428/914
4,168,978 9/1979 Koenig ............................... 428/914
4,358,488 11/1982 Dunklin et al. ..................... 428/137
4,522,864 6/1985 Humason et al. ................... 156/240
4,590,138 5/1986 Lambert et al. .................... 430/330

FOREIGN PATENT DOCUMENTS 2649980 5/1978 Fed. Rep. of Germany ...... 156/277
8302397 2/1985 Netherlands ........................ 156/277

*Primary Examiner*—Merrell C. Cashion, Jr.
*Attorney, Agent, or Firm*—Gregory J. Nelson

[57] ABSTRACT

A method for applying informational images, such as advertising, to surfaces, particularly the windows of commercial vehicles. The method comprises applying a UV resistant emulsion to a laminate substrate of perforated metalized polymeric vinyl. The coated substrate is silk-screened with the appropriate image and is secured to the interior of the vehicle window by a peripheral tape strip and by spray adhesive.

3 Claims, 2 Drawing Sheets

METHOD FOR APPLYING INFORMATION TO A TRANSPARENT SURFACE

The present invention relates to a method for applying information and images to a surface and more particularly relates to a method for applying information such as advertising material to a transparent surface such as glass.

Various types of advertising displays can be found in connection with vehicles. Typically, such advertising displays may consist of signs or placards placed on the side or rear of the vehicle. In some cases, the signs are simply printed on heavy stock paper and over a period of time due to weather conditions will deteriorate and fade. Some advertising materials and signs of this type are made from a relatively thin sheet plastic and attached magnetically to the vehicle sides. These type of signs weather better but may scratch the vehicle finish and further do not provide the advertiser wide latitude in design and artwork.

A particularly suitable location for advertising is on the rear view window of the vehicle. Vehicles, particularly commercial vehicles such as limousines, taxi cabs, delivery vehicles and the like are suited for this purpose since the rear window is generally in a highly viewable location for pedestrians and other motorists and offers a substantial surface for this purpose. Further, since vehicles of this type spend a great deal of time in urban traffic, the advertising impact can be significant. For example, it has been estimated that an advertising message carried on the rear view of a commercial cab in a large metropolitan city is viewed in excess of sixty times per mile of travel. The average taxi cab operates approximately two hundred sixty five miles per day, thus the advertiser's impact is significant, particularly when it is considered that the window location is available for little additional cost.

One problem with utilizing window locations for carrying advertising messages is that conventional signs obvious reasons of safety cannot be used. The use of limited size lettering or decals is not acceptable because of the size limitation necessary to provide adequate viewing area through the window severely diminishes the advertising effect and impression to be gained from the message. Further, stickers, lettering and decals applied directly to the interior of the glass of the rear window will often suffer severe detrimental effects from the sun, particularly ultraviolet radiation.

Accordingly, there exists a need in the prior art for an effective and efficient way of applying messages, particularly advertising, and other information and images to vehicle windows. In accordance with the present invention, a method of applying such informational messages is provided in which the appropriate message is applied to a perforated Mylar screen or substrate. The Myler screen is prepared applying a U.V. protector in the non-image carrying areas. The desired information, message and/or images in appropriate colors are applied by silk-screening techniques. When the Mylar substrate has been provided with the appropriate image, it is trimmed to fit the location in which it is to be applied such as in the rear window of a commercial vehicle. Adhesive is placed about the outer periphery of the substrate, preferably using a double face tape. The entire substrate is also coated with the transfer adhesive such as an aerosol adhesive. The substrate carrying the message is then adhesively applied to the transparent surface.

The above and other objects and advantages of the present invention will be more fully appreciated from the following description taken in conjunction with the drawings in which.

The present invention will be described with reference to the application of an advertising slogan on the rear window of a commercial vehicle such as a taxi cab. It is understood that the present method is applicable to the application of a message-bearing or informational-bearing substrate to any transparent surface such as a store window, particularly when ultraviolet radiation poses a particular problem. A further advantage of the invention is that the result is a message which may easily be removed or replaced and which still allows substantial visibility so that a viewer may still view objects through the sign. In the case of application of the substrate to a window of a vehicle, the substrate further serves as a sunscreen to reduce the effects of ultraviolet and infrared radiation on the interior of the vehicle.

Figure 3:
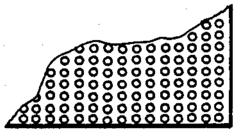
FIGS. 3 to 9 are detail views of a portion of the substrate illustrating the various steps of the method as applied to the substrate.
Figure 4:
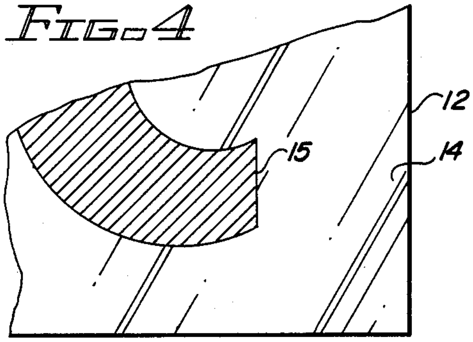
Figure 2:
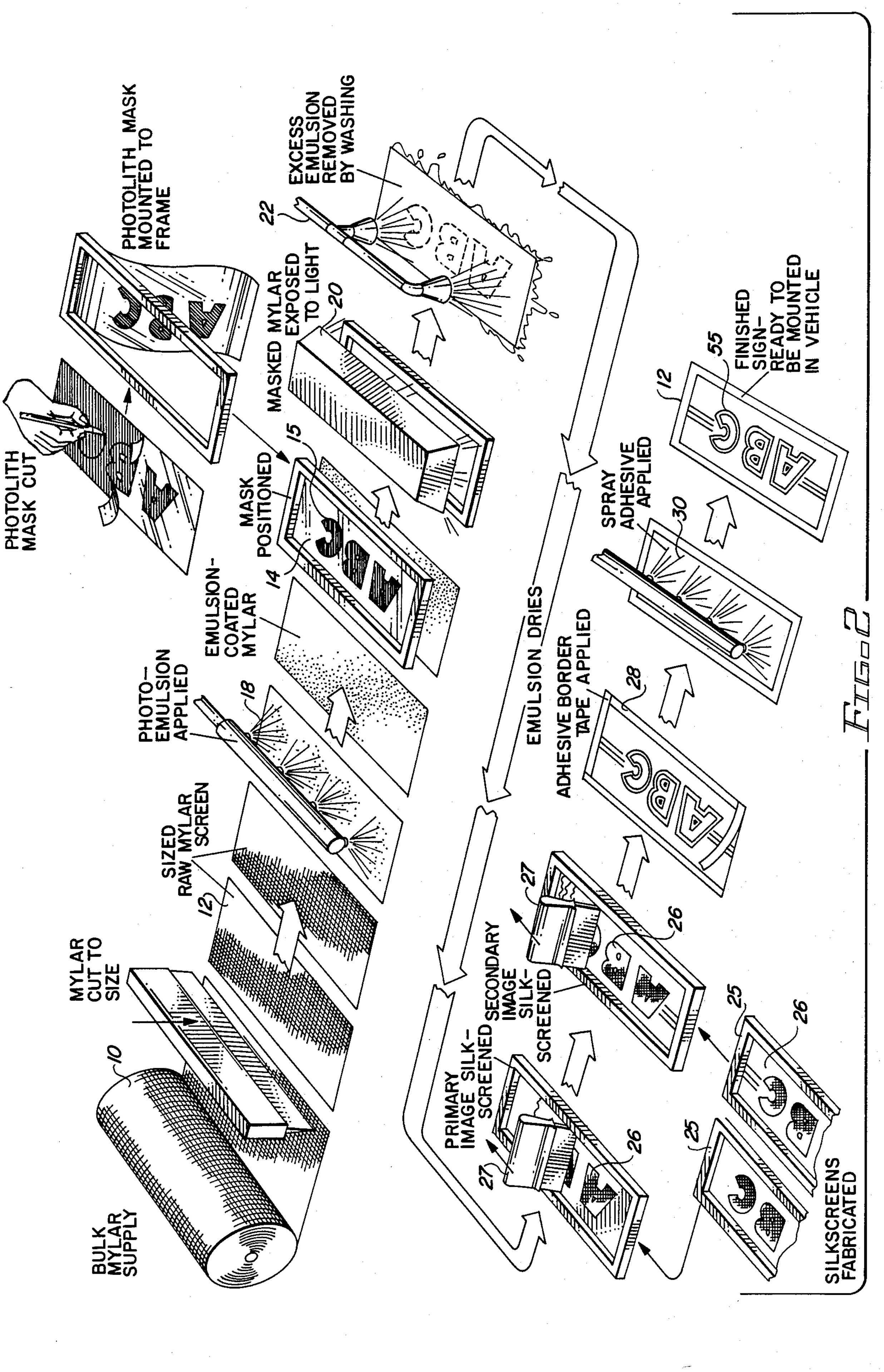
FIG. 2 is a schematic diagram illustrating the sequential steps in carrying out the method of the invention.

FIG. 2 illustrates the sequential steps in preparing a substrate 12 carrying advertising or informational material. FIGS. 3 to 9 are detail views of a portion of the substrate illustrating the changes as the various steps of the method are applied. The substrate material 10 to which the advertising or informational material is applied consists of a polymeric vinyl such as the material manufactured and sold under the trademark Mylar. The polymeric material is metalized having a laminate of a metal foil and is thereafter embossed in a suitable pattern. One particular pattern for this purpose consists of a series of small diamond shaped impressions known as a "gleam" pattern. The laminate metalized Mylar structure is perforated to form a screen-like substrate which allows substantial passage of light therethrough so that images are visible through the substrate as seen in FIG. 3. Such laminate, perforated Mylar materials are known to those skilled in the art.

The substrate 10 is preferably supplied in bulk form in a roll or otherwise as shown in FIG. 2. A section of the substrate 10 is cut to appropriate size in individual sheets or sections 12. The individual section or sheet 12 is initially prepared to resist U.V. radiation. This is done by preparing a photo film positive such as a ruby litho positive 14 (sometimes termed a "mask") which has areas 15 corresponding to the information and images 15 to be placed on the sheet 12 and block light from those areas. The photo film positive has an adhesive backing and is placed on the substrate which is first entirely coated with a photo coat emulsion 18 such as that manufactured and sold under the brand Ulano No. 569. The coated substrate is then allowed to dry for three to four hours and then the photo film positive 14 is applied on the coated substrate. The photo coat is exposed by exposing the substrate to artificial light 20 or to bright sunlight for a period of time, typically forty-five to ninety seconds. The ruby lithograph mask 15 serves to block ultraviolet light in selected image areas. After exposure, the ruby litho 15 is peeled off and the entire substrate washed by rinsing apparatus 22. The emulsion washes out from the image areas 55 corresponding to the locations masked by the ruby litho 15.

The prepared substrate is now ready for the next step which is the application of information and images in the appropriate colors by silk-screening. Silk-screening can be accomplished in a conventional silk-screening device having a frame 24. The prepared sheet of substrate 12 is placed in a conventiona silk-screening frame 24 and covered by a silk-screen mesh 26 having appropriate images thereon.

Figure 7:
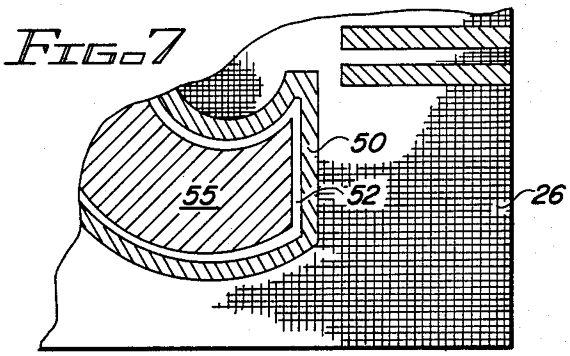
Figure 5:
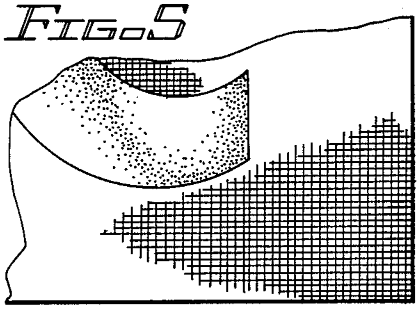
Figure 8:
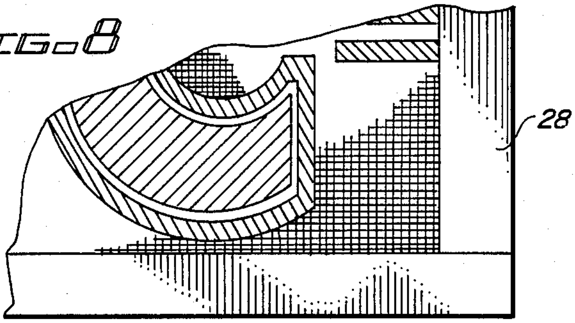
Figure 6:
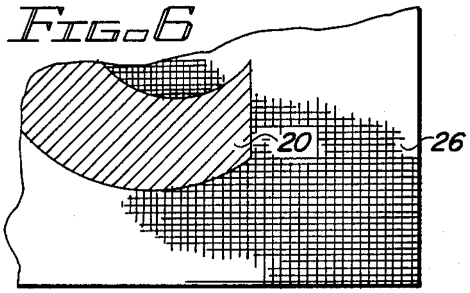
Figure 9:
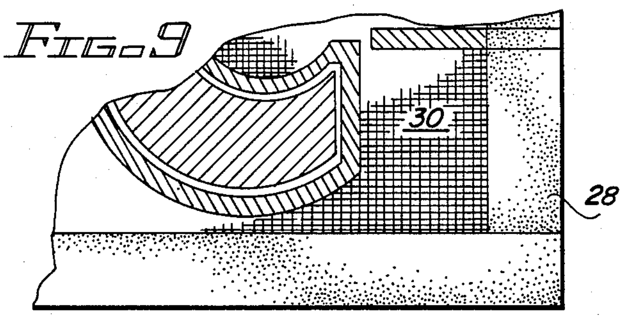

Ink in the selected colors is applied over the top of the silk-screen 26 and spread across the silk-screen with a tool 27 such as a sharp rubber squeegee. As is known in the art, the ink will pass through selected areas of the screen transferring the ink to selected areas of the substrate. If multiple colors are to be applied, the substrate is allowed to dry between silk-screening operations and multiple screening operations are conducted as indicated in FIGS. 6 and 7 so that primary image 50 is first applied and thereafter a secondary image 52 resulting in a completed image 55. The inks utilized may be any suitable ink, however, it has been found that the ink sold under the brand name Nazdar Series MY, works particularly well as a Mylar silk-screening ink.

Once the substrate has been silk-screened and the operation is completed, it is allowed to air dry on a rack until the ink is set.

Figure 1:
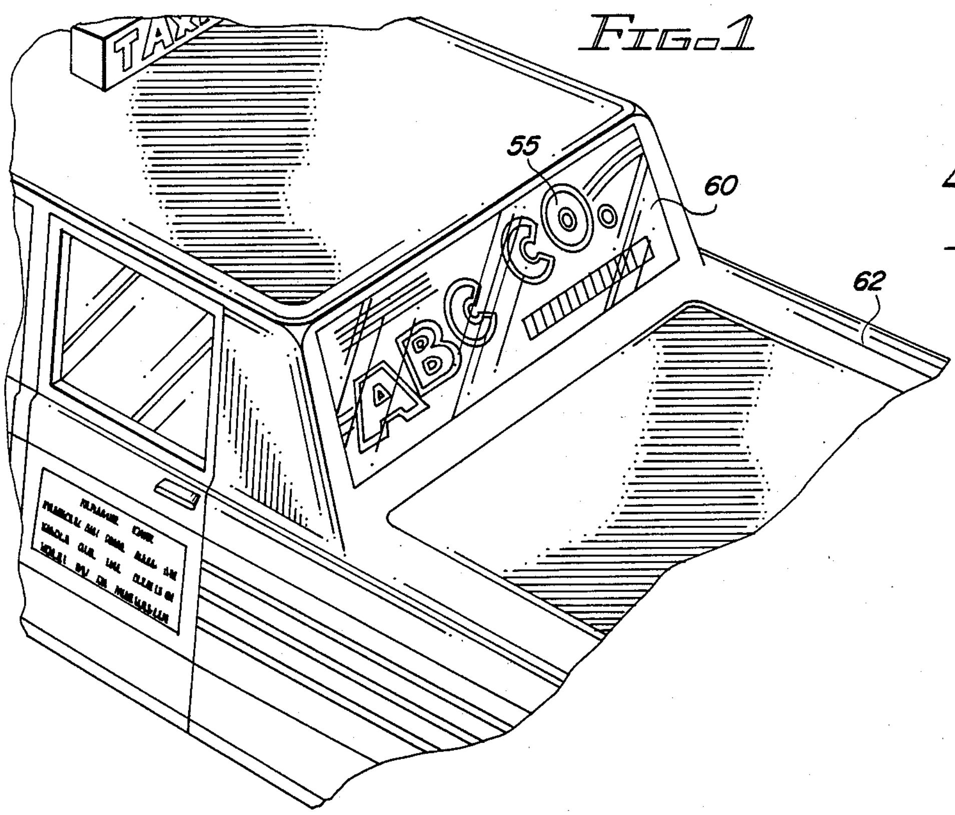
FIG. 1 is a perspective view of the rear portion of a vehicle with a display sign secured to the rear window in accordance with the invention.

The prepared substrate is now ready for the installation operation. The periphery of the substrate may be further trimmed to fit, as for example, the interior of the rear window 60 of a vehicle 62 as shown in FIG. 1. The periphery of the substrate is coated with a suitable adhesive 28 such as a double-face tape which is conventionally available, such as that manufactured by 3M Company. After application of the peripheral strip of double-face tape, the entire surface of the substrate interior of the peripheral tape strip is further coated with an adhesive such as an aerosol spray adhesive 30. The product manufactured by 3M and sold under the designation "Super 77 Spray Aerosol Adhesive" works well for this purpose. After application of the spray adhesive, the completed substrate 12 with images 55 therein is positioned on the rear vehicle window 60 and secured by application of pressure.

The advertising or message-carrying substrate provides a highly visible location The perforations, at least in the area where the information or message is applied, allow light to pass through and thus the sign does not totally obstruct driver and passenger vision through the sign so that a safety hazard is not presented. Further, the screen serves to minimize the amount of sunlight entering the interior of the vehicle. The substrate along with the applied information or message are highly ultraviolet resistive and can remain in place for a long period of time with out deterioration. Since the substrate is adhesively secured in place, it may be readily removed and replaced when necessary.

The foregoing method has been described with reference to advertising messages carried on commercial vehicles. It will be obvious that the present invention has wide application to other signage and advertising applications. Accordingly, it will be obvious to those skilled in the art to make various changes, alterations and modifications to the method described herein. To the extent these various changes, alterations and modifications do not depart from the spirit and scope of the appended claims, they are intended to be encompassed herein.

We claim:

1. A method of applying informational images to a surface such as a vehicle window comprising:

(a) providing a perforated polymeric substrate of predetermined size;
(b) coating a surface of said perforated polymeric substrate with a photo coat emulsion;
(c) applying a mask to the coated polymeric substrate in selected areas to define image-bearing areas corresponding to the areas of the substrate immediately beneath said mask;
(d) exposing the polymeric substrate to light;
(e) removing the mask from the substrate;
(f) washing the polymeric substrate to remove the emulsion from the image areas;
(g) silkscreening at least predetermined portions of said image areas to impart images thereon; and
(h) adhesively securing the substrate to said window.

2. The method of claim 1 wherein multiple silkscreening applications of ink are applied to the substrate.

3. The method of claim 1 wherein a first adhesive is applied at least along a portion of the periphery of said substrate and wherein a second adhesive is applied to at least a portion of the substrate defined by said peripheral first adhesive.

* * * * *